US010444604B2

(12) United States Patent
Saito

(10) Patent No.: US 10,444,604 B2
(45) Date of Patent: Oct. 15, 2019

(54) IMAGE PROJECTION APPARATUS AND IMAGE PROJECTION METHOD

(71) Applicant: Yoshito Saito, Kanagawa (JP)

(72) Inventor: Yoshito Saito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/190,374

(22) Filed: Nov. 14, 2018

(65) Prior Publication Data

US 2019/0235360 A1  Aug. 1, 2019

(30) Foreign Application Priority Data

Jan. 26, 2018  (JP) .................. 2018-011972

(51) Int. Cl.
  *G03B 21/14*    (2006.01)
  *G03B 21/00*    (2006.01)
  *G03B 21/20*    (2006.01)
  *G02B 26/08*    (2006.01)

(52) U.S. Cl.
  CPC ......... *G03B 21/008* (2013.01); *G02B 26/085* (2013.01); *G03B 21/142* (2013.01); *G03B 21/2053* (2013.01)

(58) Field of Classification Search
  CPC .. G03B 21/142; G03B 21/005; G03B 21/006; G03B 21/008; G03B 21/14; G03B 21/2053
  See application file for complete search history.

(56) References Cited

U.S. PATENT DOCUMENTS

| 5,883,742 | A  | 3/1999  | Kamata |
| 7,002,760 | B2 | 2/2006  | Von Poncet et al. |
| 7,043,848 | B2 | 5/2006  | Hollman et al. |
| 7,389,519 | B2 | 6/2008  | Yamanaka et al. |
| 7,639,933 | B2 | 12/2009 | Seo et al. |
| 7,782,558 | B2 | 8/2010  | Onishi et al. |
| 8,167,433 | B2 | 5/2012  | He |
| 8,446,672 | B2 | 5/2013  | Omi |
| 9,213,223 | B2 | 12/2015 | Mashitani |
| 9,253,431 | B2 | 2/2016  | Tani et al. |
| 9,354,494 | B2 | 5/2016  | Mashitani et al. |
| 10,091,472 | B2 | 10/2018 | Mikawa |

(Continued)

FOREIGN PATENT DOCUMENTS

| JP | 2002-250970 | 9/2002 |
| JP | 2008-015452 | 1/2008 |

(Continued)

*Primary Examiner* — Ryan D Howard
(74) *Attorney, Agent, or Firm* — IPUSA, PLLC

(57) ABSTRACT

An image projection apparatus including a light source; an optical element configured to form an image by modulating a light emitted by the light source; a movable portion to which the optical element is attached, the movable portion being movably supported; a position detector configured to detect a position of the movable portion; a projector configured to project the image formed at a predetermined position by using the position detected by the position detector; and a controller configured to execute calibration with respect to the position detector, and to execute at least one of turning off the light source before executing the calibration in response to the light source being on, and turning on the light source after the calibration is executed.

7 Claims, 15 Drawing Sheets

(56) References Cited

U.S. PATENT DOCUMENTS

2017/0244940 A1* 8/2017 Mikawa ............... G03B 21/16
2017/0272718 A1   9/2017 Mikawa et al.
2017/0347070 A1  11/2017 Yamada et al.

FOREIGN PATENT DOCUMENTS

| | | |
|---|---|---|
| JP | 2008-107527 | 5/2008 |
| JP | 2008-292647 | 12/2008 |
| JP | 2011-027821 | 2/2011 |
| JP | 2012-181386 | 9/2012 |
| JP | 5084308 | 11/2012 |
| JP | 2013-117629 | 6/2013 |
| JP | 5365314 | 12/2013 |
| JP | 5381450 | 1/2014 |
| JP | 2017-083631 | 5/2017 |
| JP | 2017-167496 | 9/2017 |
| WO | 2016/067519 | 5/2016 |

* cited by examiner

IMAGE PROJECTION APPARATUS AND IMAGE PROJECTION METHOD

CROSS-REFERENCE TO RELATED APPLICATION

The present application is based on and claims priority under 35 U.S.C. § 119 to Japanese Patent Application No. 2018-011972, filed on Jan. 26, 2018, the contents of which are incorporated herein by reference in their entirety.

BACKGROUND OF THE INVENTION

1. Field of the Invention

The present invention relates to an image projection apparatus and an image projection method.

2. Description of the Related Art

There is known a method of shifting an optical element such as a digital micromirror device (DMD) (hereinafter simply referred to as "DMD") to increase the resolution of an image to be projected.

In regard to this method, there is known a method of detecting the position of the DMD with a position detecting unit having a configuration in which a Hall element provided in a movable portion having a DMD, etc., and a driving magnet provided in a fixed portion that movably supports the movable portion, are opposite to each other (for example, Patent Document 1, etc.).

Furthermore, in regard to an apparatus for oscillating an optical element such as a curved mirror, there is known a method in which a sensor, etc., detects environmental information such as the temperature and stores correction information, and a position or an angle, etc., to be the reference of oscillation is corrected (for example, Patent Document 2, etc.).

Furthermore, in regard to calibrating the output of laser light, which is performed by a projection apparatus, etc., in a head-up display, there is known a method of shielding the calibration light with an aperture so as not to emit laser light, etc., from the projection apparatus (for example, Patent Document 3, etc.).

Patent Document 1: Japanese Unexamined Patent Application Publication No. 2017-167496
Patent Document 2: Japanese Unexamined Patent Application Publication No. 2008-15452
Patent Document 3: Japanese Unexamined Patent Application Publication No. 2017-83631

SUMMARY OF THE INVENTION

An aspect of the present invention provides an image projection apparatus and an image projection method, in which one or more of the disadvantages of the related art are reduced.

According to one aspect of the present invention, there is provided an image projection apparatus including a light source; an optical element configured to form an image by modulating a light emitted by the light source; a movable portion to which the optical element is attached, the movable portion being movably supported; a position detector configured to detect a position of the movable portion; a projector configured to project the image formed at a predetermined position by using the position detected by the position detector; and a controller configured to execute calibration with respect to the position detector, and to execute at least one of turning off the light source before executing the calibration in response to the light source being on, and turning on the light source after the calibration is executed.

DETAILED DESCRIPTION OF THE PREFERRED EMBODIMENTS

As described in Patent Document 2, in the image projection apparatus of the related art, the calibration with respect to the sensor that detects the position of the movable portion to which the optical element is attached, is performed when the image projection apparatus is used, that is, when the light source is on. Then, when executing the calibration of the sensor that detects the position of the movable portion to which the optical element is attached, for example, the movable portion is moved from one end to the other end of a movable range whose length is known, and it is confirmed whether correction of the reaction of the sensor is necessary. However, at this time, the light source is on, and, therefore, there is a problem that the movement of the projection position of the projection image during the calibration, is projected on the screen. If there is a light shielding part that shields the calibration light as in Patent Document 3 described above, even if calibration is performed while the light source is on, the movement of the projection position of the projection image will not be projected; however, a configuration for shielding the light will be necessary.

A problem to be solved by an embodiment of the present invention is to prevent the movement of the projection position of a projection image from being projected, during calibration of a sensor that detects a position of a movable portion to which an optical element is attached, without using a light shielding unit.

Embodiments of the present invention will be described by referring to the accompanying drawings. The embodiments are not limited by the following description, and can be appropriately changed without departing from the gist of the present invention. Furthermore, in the following description, the side where the first movable plate is disposed may be referred to as the "top" or "upper" side, and the side where the heat sink is disposed may be referred to as the "bottom" or "lower" side.

<Example of Image Projection Apparatus>

Hereinafter, an example in which the image projection apparatus is a projector will be described.

Figure 1:
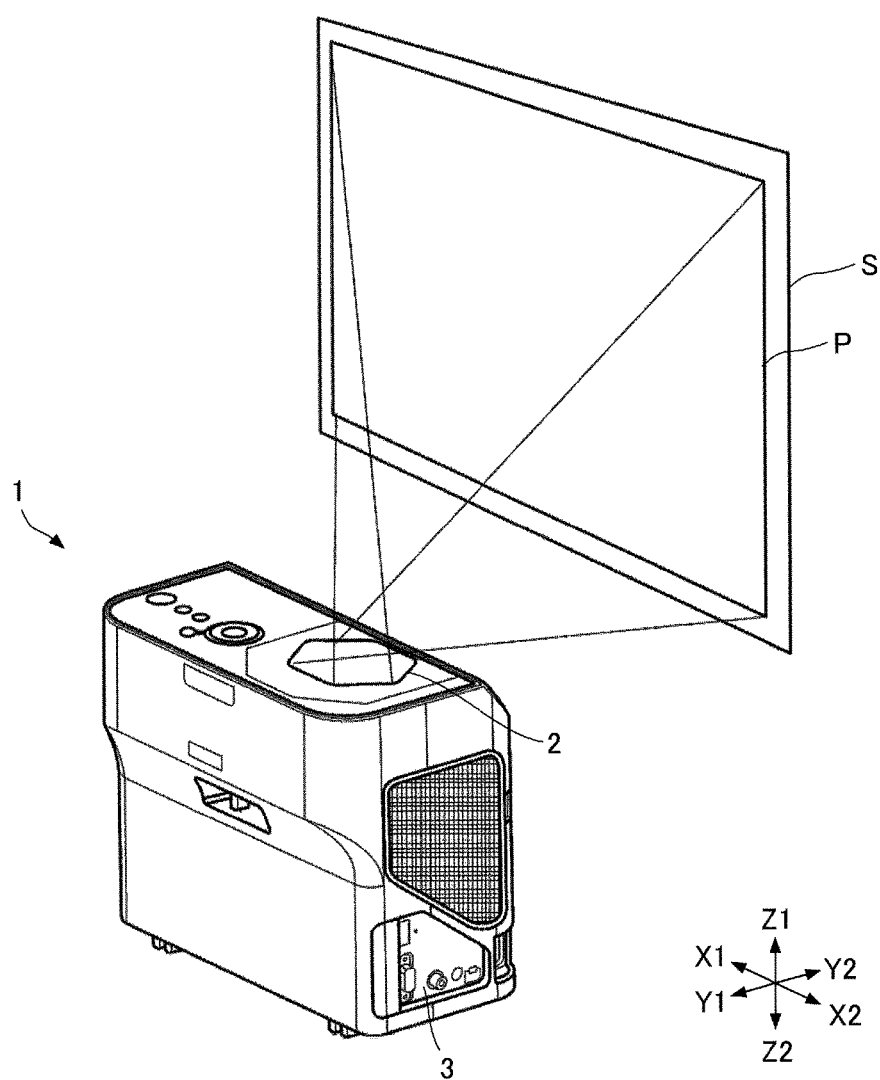
FIG. 1 is a diagram illustrating an example of an image projection apparatus according to an embodiment of the present invention.

FIG. 1 is a diagram illustrating an example of an image projection apparatus according to an embodiment. In this example, a projector 1 includes a light emission window 2 and an external interface (external I/F) 3, and includes an optical engine that generates projection images. Furthermore, in the projector 1, for example, when image data is transmitted from an external device such as a personal computer or a digital camera, etc., connected to the external I/F 3, the optical engine generates a projection image based on the transmitted image data, and an image P is projected onto a screen S from the light emission window 2.

Hereinafter, in the drawings, the X1-X2 direction (X axis direction) is the width direction of the projector 1. Furthermore, the Y1-Y2 direction (Y axis direction) is the depth direction of the projector 1. Furthermore, the Z1-Z2 direction (Z axis direction) is the height direction of the projector 1. Furthermore, in the following description, there are cases where the light emission window 2 side of the projector 1 is described as the "top" in the Z axis direction and the opposite side from the light emission window 2 is referred to as the "bottom".

Figure 2:
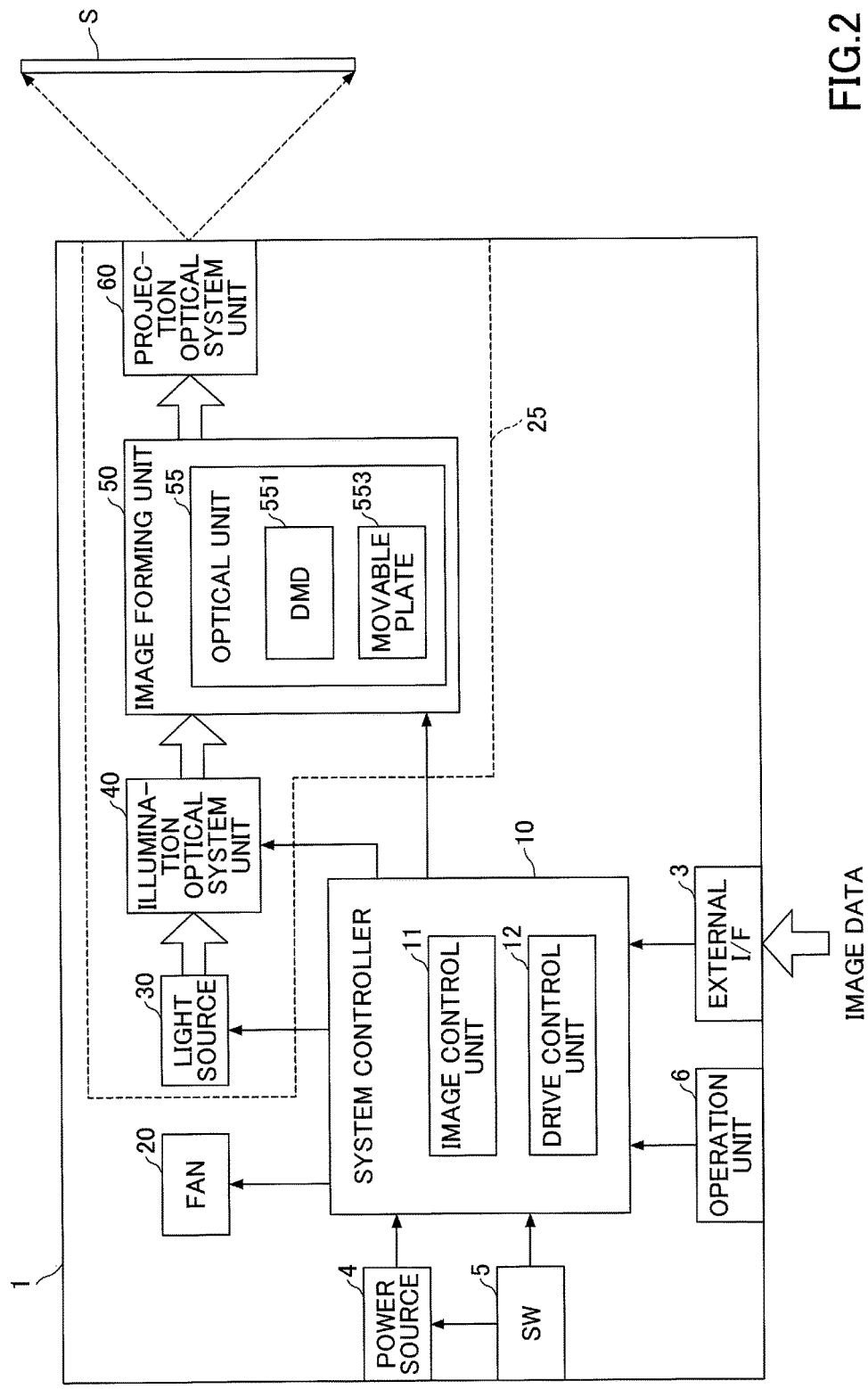
FIG. 2 is a block diagram illustrating an example of a hardware configuration of a projector according to an embodiment of the present invention.

FIG. 2 is a block diagram illustrating an example of a hardware configuration of the projector 1 according to the embodiment. In the illustrated example, the projector 1 includes the external I/F 3, a power source 4, a main switch (SW) 5, an operation unit 6, a system controller 10, a fan 20, and an optical engine 25.

The power source 4 is connected to a commercial power source, converts the voltage and frequency for an internal circuit included in the projector 1, and supplies power to the system controller 10, the fan 20, or the optical engine 25, etc.

The SW 5 is used for the ON/OFF operation of the projector 1 by the user. Specifically, when the SW 5 is ON while the power source 4 is connected to the commercial power supply via a power cord, etc., the system controller 10 starts to supply power to each unit of the projector 1. On the other hand, when the SW 5 is OFF, the system controller 10 stops supplying power to each unit of the projector 1.

The operation unit 6 includes buttons, etc., for accepting various operations by the user. For example, the operation unit 6 is provided on the upper surface of the projector 1. The operation unit 6 accepts an operation by the user such as for the size of the projection image, the color tone, and the focus adjustment, etc. Next, the operation by the user accepted by the operation unit 6, is sent to the system controller 10.

The external I/F 3 is, for example, a connection terminal, etc., connected to an external device. The external I/F 3 outputs image data transmitted from the connected external device, to the system controller 10.

The system controller 10 includes, for example, an image control unit 11 and a drive control unit 12, etc. For example, the system controller 10 includes a Central Processing Unit (CPU) and a storage device, etc. Furthermore, the function of the system controller 10 is implemented, for example, by the CPU executing a program stored in a Read-Only Memory (ROM), in interoperation with a Random Access Memory (RAM).

The image control unit 11 controls a DMD 551 included in the optical engine 25 based on the image data input from the external I/F 3, and generates an image to be projected on the screen S.

The drive control unit 12 controls a driving unit that drives a first movable plate 553, etc., included in an optical unit 55, and controls the position of the DMD 551.

The fan 20 is rotated under the control of the system controller 10, and cools a light source 30, etc., which is a lamp unit of the optical engine 25.

The optical engine 25 includes the light source 30, an illumination optical system unit 40 for displaying an image to be projected, an image forming unit 50 for generating an image to be projected, and a projection optical system unit 60 for projecting an image, etc. Furthermore, the optical engine 25 projects an image on the screen S based on control by the system controller 10.

For example, an illumination unit is implemented by the light source 30 and the illumination optical system unit 40, etc. Furthermore, for example, a projection unit is implemented by the projection optical system unit 60, etc.

The light source 30 includes, for example, a mercury high-pressure lamp, a xenon lamp, or a Light Emitting Diode (LED), etc. For example, the light source 30 is controlled by the system controller 10, and irradiates the illumination optical system unit 40 with light.

The illumination optical system unit 40 includes, for example, a color wheel, a light tunnel, and a relay lens, etc. The illumination optical system unit 40 guides the light emitted from the light source 30 to the DMD 551 included in the image forming unit 50.

The image forming unit 50 includes the optical unit 55. Furthermore, the DMD 551 included in the image forming unit 50 is controlled by the image control unit 11 included in the system controller 10, and modulates the light guided by the illumination optical system unit 40 to generate a projection image.

The projection optical system unit 60 includes, for example, a plurality of optical components such as projection lenses and mirrors, etc. The projection optical system unit 60 enlarges an image generated by the DMD 551 of the image forming unit 50 and projects the image on the screen S.

<Example of Optical Engine>

A configuration example of the optical engine 25 will be described below.

Figure 3:
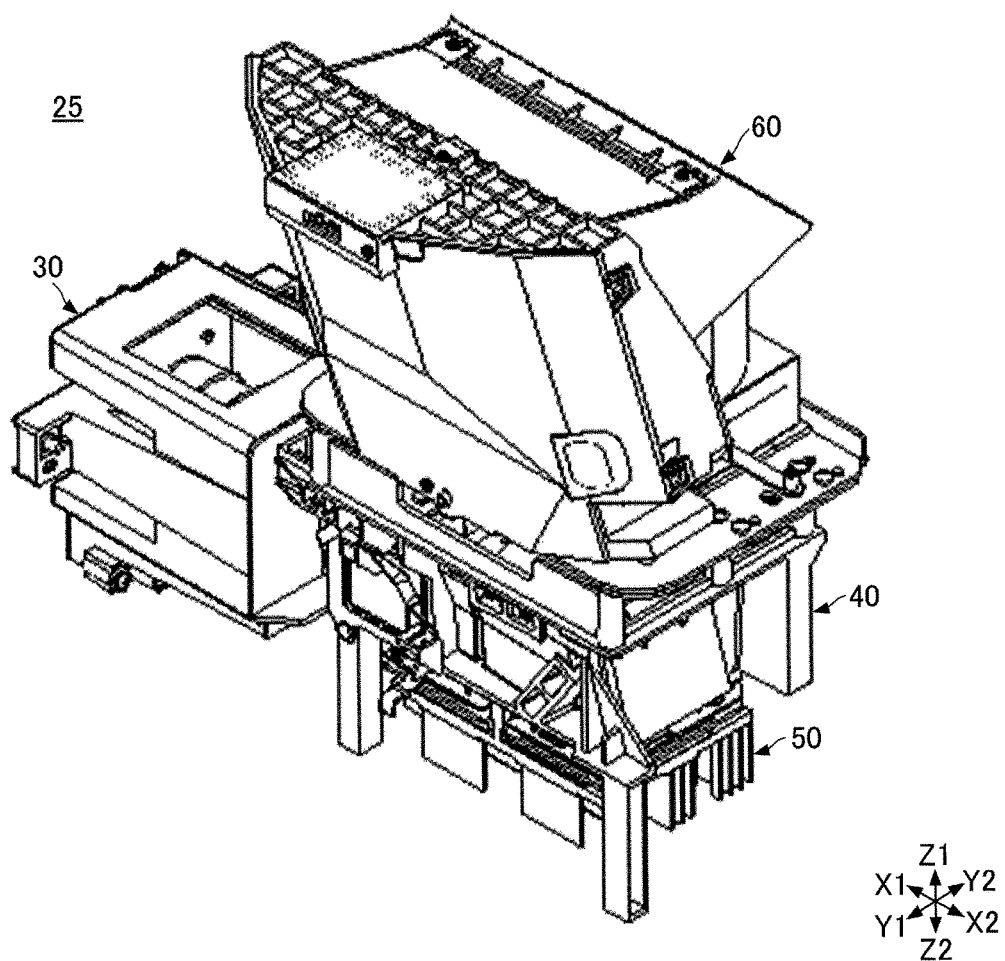
FIG. 3 is a perspective view of an optical engine according to an embodiment of the present invention.

FIG. 3 is a perspective view of the optical engine 25 according to the embodiment. In the illustrated example, the optical engine 25 is provided inside the projector 1. Furthermore, the optical engine 25 includes the light source 30, the illumination optical system unit 40, the image forming unit 50, and the projection optical system unit 60, etc.

In the illustrated example, the light source 30 is provided on the side surface of the illumination optical system unit 40 and irradiates light in the X2 direction. Next, the illumination optical system unit 40 guides the light emitted from the light source 30 to the image forming unit 50 located at the lower part. Subsequently, the image forming unit 50 generates a projection image by using the light guided by the illumination optical system unit 40. Furthermore, the projection optical system unit 60 is provided above the illumination optical system unit 40, and projects the projection image generated by the image forming unit 50 to the outside of the projector 1.

Note that in the illustrated example, the optical engine 25 projects an image upward by using the light emitted from the light source 30; however, the direction in which the image is projected is not limited to the upward direction. For example, the image may be projected in the horizontal direction, etc.

Figure 4:
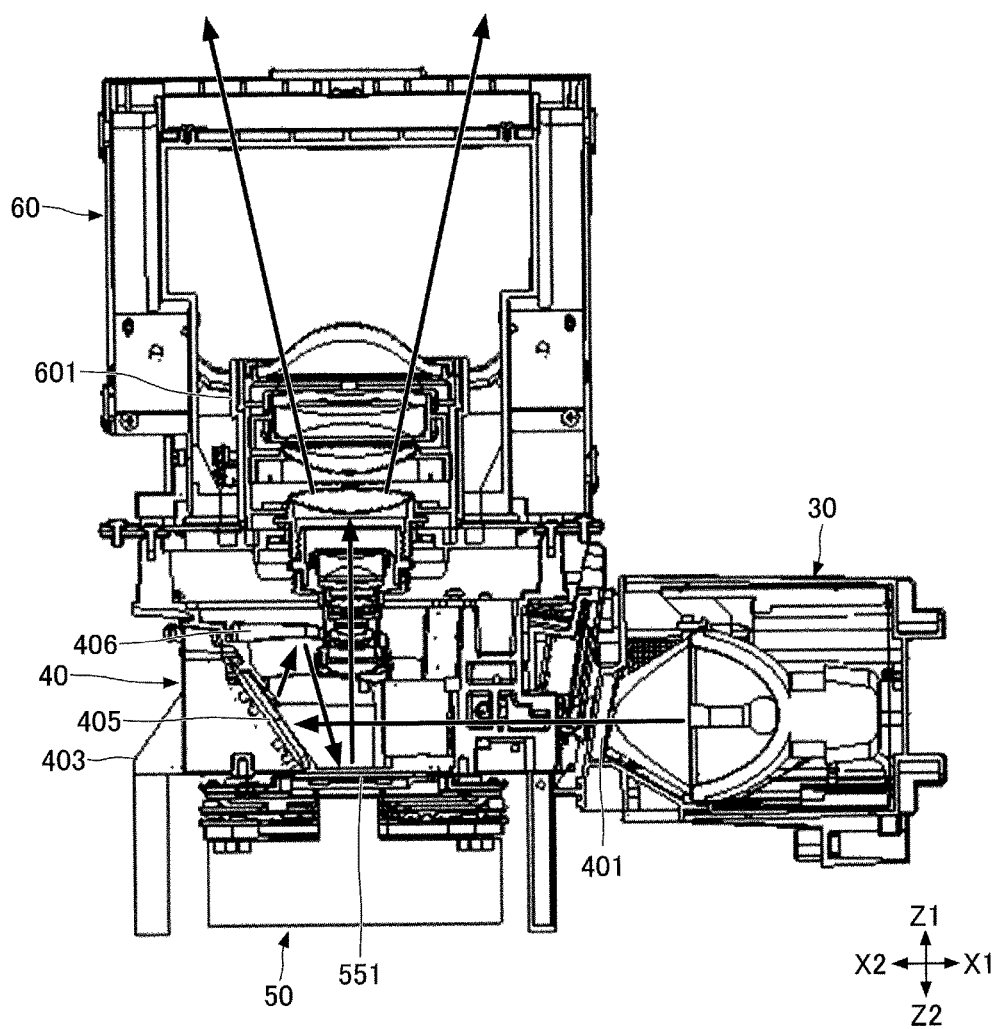
FIG. 4 is a schematic view illustrating an example of an internal configuration of an optical engine according to an embodiment of the present invention.

FIG. 4 is a schematic view of the internal configuration of the optical engine 25 according to the embodiment.

As illustrated in the figure, the illumination optical system unit 40 includes a color wheel 401, a plane mirror 405, and a concave mirror 406, etc.

The color wheel 401 is, for example, a disk, etc., provided with filters of the respective colors of R (red), G (green), and B (blue) at different portions in the circumferential direction. By rotating the color wheel 401 at a high speed, the light emitted from the light source 30 is time-divided into the respective colors of RGB.

The plane mirror 405 and the concave mirror 406 reflect the light, which is time-divided into the respective colors of RGB by the color wheel 401, to the DMD 551 of the image forming unit 50. Furthermore, the color wheel 401, the plane mirror 405, and the concave mirror 406, etc., are supported by a base 403. The base 403 is fixed inside the casing of the projector 1.

Note that in the illumination optical system unit 40, for example, a light tunnel or a relay lens, etc., may be provided between the color wheel 401 and the plane mirror 405.

The DMD 551 modulates the reflected light from the concave mirror 406 to generate a projection image. The projection image generated by the DMD 551 is guided to the projection optical system unit 60 through the illumination optical system unit 40.

Figure 5:
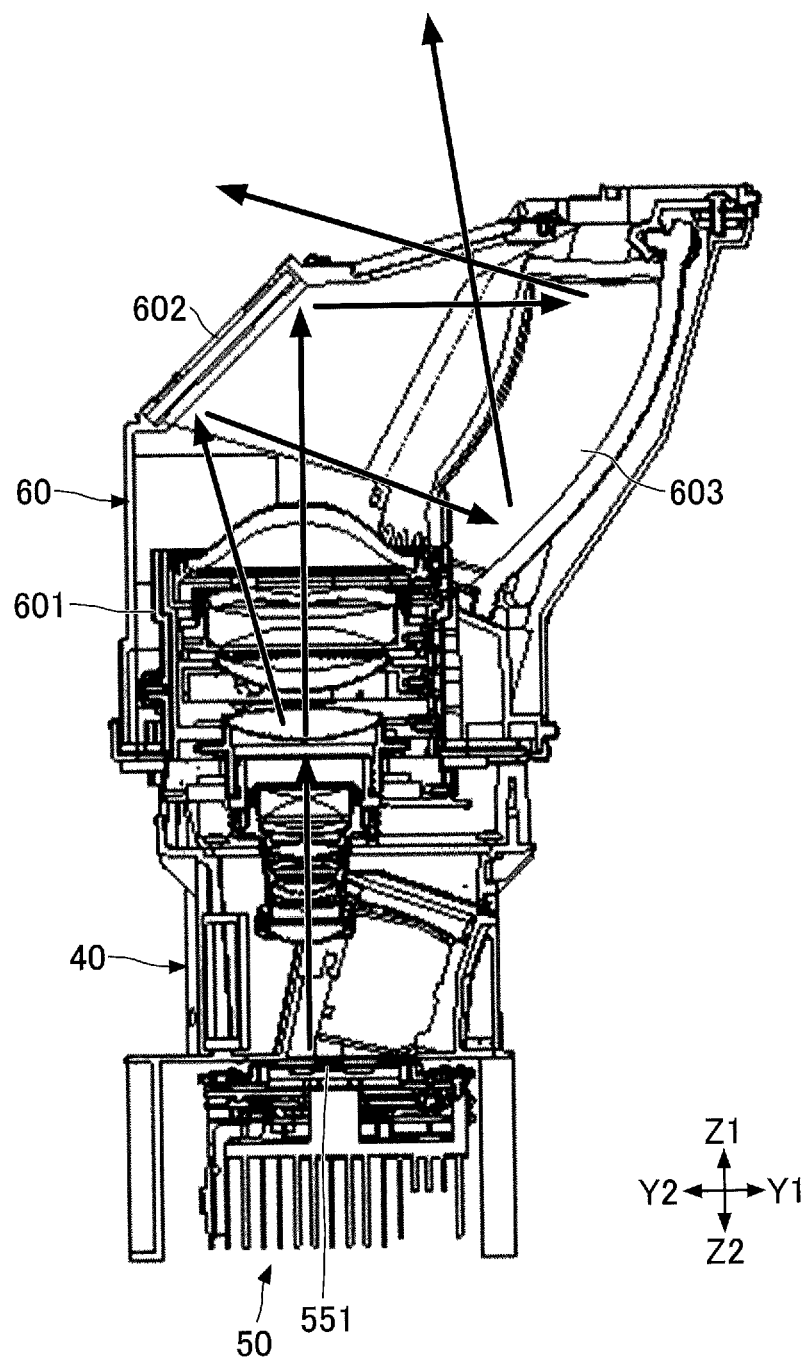
FIG. 5 is a schematic view illustrating an example of an internal configuration of an optical engine according to an embodiment of the present invention.

FIG. 5 is a schematic view of an example of the internal configuration of the optical engine 25 according to the embodiment.

As illustrated in FIGS. 4 and 5, the projection optical system unit 60 includes a projection lens 601, a folding mirror 602, and a curved mirror 603, etc., inside a case.

The projection lens 601 includes a plurality of lenses. The projection lens 601 forms a projection image generated by the DMD 551, on the folding mirror 602. Next, the folding mirror 602 and the curved mirror 603 reflect the formed projection image so as to enlarge and project the image onto the screen S, etc., outside the projector 1.

<Example of Image Forming Unit>

Figure 6:
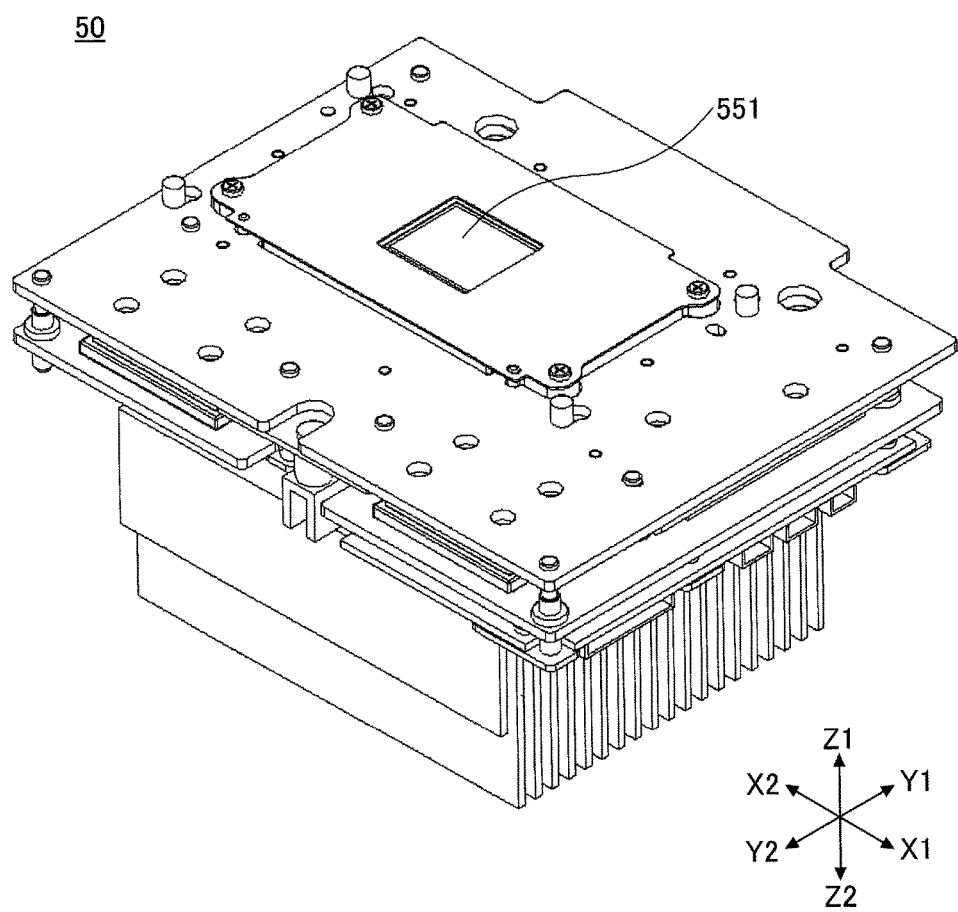
FIG. 6 is a perspective view of an example of an image forming unit according to an embodiment of the present invention.

FIG. 6 is a perspective view of an example of the image forming unit 50 according to the present embodiment.

Hereinafter, as illustrated, an image forming unit provided with an optical unit in which an optical element is the image forming element, will be described as an example. In this example, the DMD 551 is the image forming element.

The image projection apparatus includes, for example, the image forming unit 50 as illustrated in the figure, and projects an image generated by the image forming unit 50 onto the screen S, etc.

Furthermore, the image forming unit 50 moves the DMD 551, for example, by about a half of one pixel. In this manner, when the DMD 551 is moved, the image projection apparatus can generate an intermediate image in the projection image, and can increase the resolution of the image.

The image forming unit 50 has the following configuration, for example.

Figure 7:
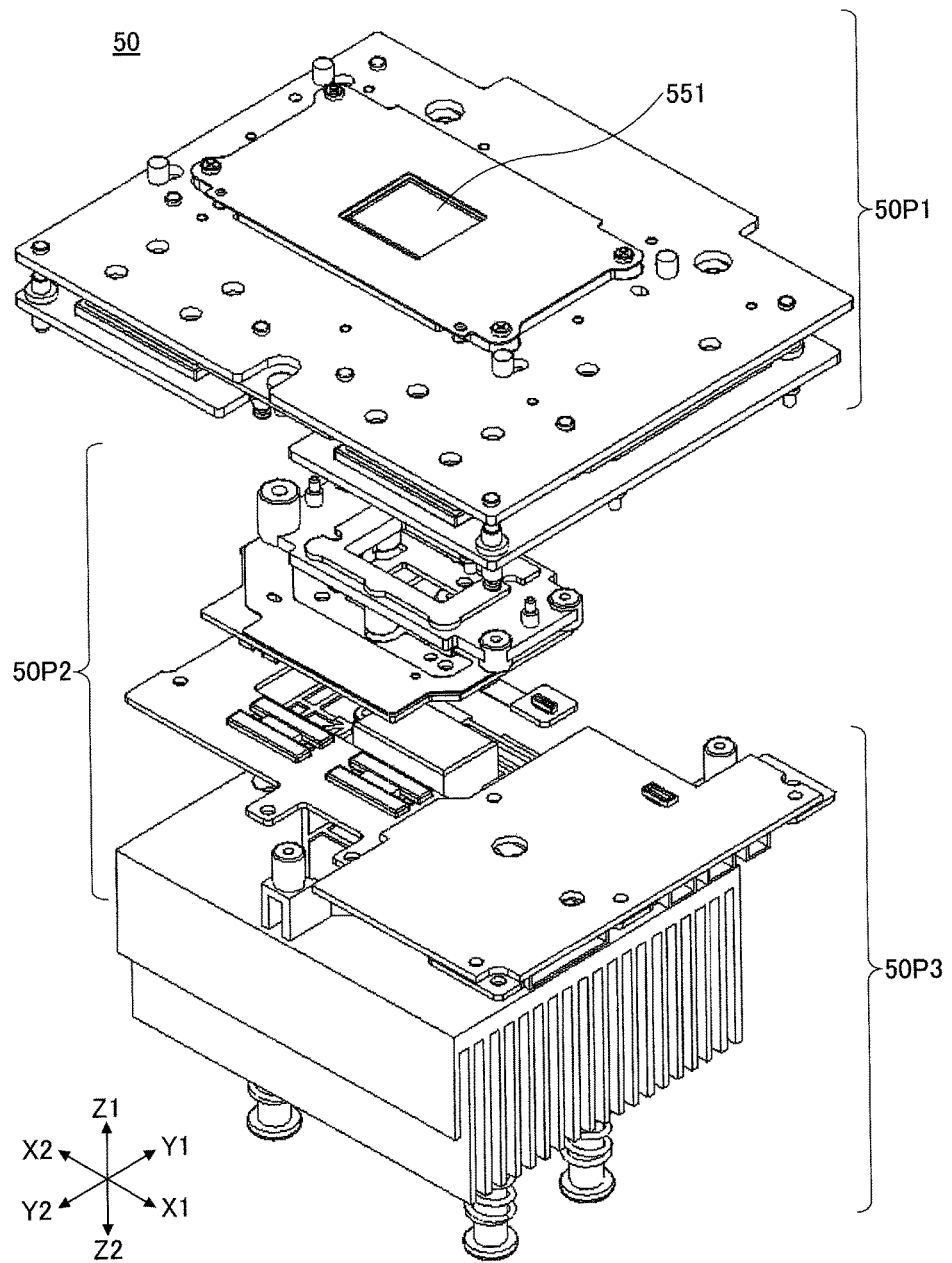
FIG. 7 is an exploded perspective view of an example of an image forming unit according to an embodiment of the present invention.

FIG. 7 is an exploded perspective view of an example of the image forming unit 50 according to the embodiment.

As illustrated in the figure, the image forming unit 50 includes, for example, a driving force generating unit 50P1, a position detecting unit 50P2, and a cooling unit 50P3. Detailed explanations for each unit will be provided in order below.

<Example of Driving Force Generating Unit>

Figure 8:
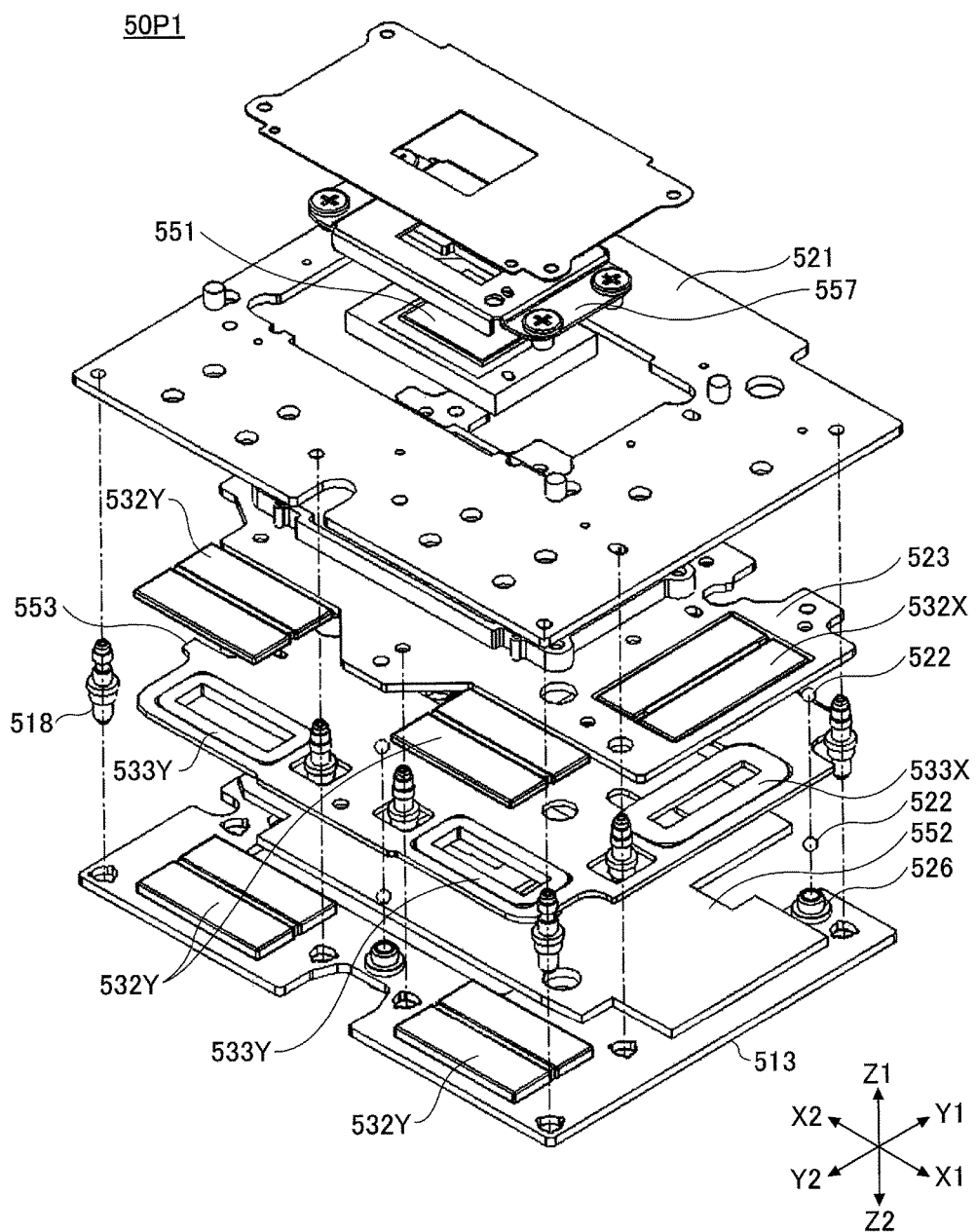
FIG. 8 is an exploded perspective view of a configuration example of a driving force generating unit according to an embodiment of the present invention.

FIG. 8 is an exploded perspective view of a configuration example of the driving force generating unit 50P1 according to the embodiment.

In the illustrated example, the driving force generating unit 50P1 includes a driving magnet 532X, a driving magnet 532Y, a voice coil 533X, and a voice coil 533Y, etc., which are actuators for moving the DMD 551. As described above, the driving force generating unit 50P1 has a configuration including, for example, an electromagnetic actuator, etc.

Furthermore, in the illustrated example, the driving force generating unit 50P1 includes movable plates such as a first movable plate 553 and a second movable plate 552 so as to transmit the motion to the DMD 551. More specifically, first, in this example, the voice coil 533X and the voice coil 533Y are disposed in the first movable plate 553.

When a current is passed through the voice coil 533X and the voice coil 533Y, a Lorentz force serving as a driving force is generated by the magnetic field formed by the driving magnet 532X and the driving magnet 532Y.

When the driving force generated by the voice coil 533X and the voice coil 533Y acts on the first movable plate 553, the first movable plate 553 moves relative to a first fixed plate 521, a second fixed plate 513, and a third fixed plate 523, etc.

Furthermore, in the illustrated example, a ball 522 and a ball supporting portion 526, etc., are disposed between the first movable plate 553 and the first fixed plate 521, and between the second movable plate 552 and the second fixed plate 513, etc. In this way, when the ball 522 and the ball supporting portion 526, etc., are provided, the movable portion is in point contact with the fixed portion. Therefore, the ball 522 and the ball supporting portion 526, etc., can reduce the friction generated during the driving operation.

Furthermore, in the illustrated example, the fixed portions such as the first fixed plate 521, the second fixed plate 513, and the third fixed plate 523, etc., are connected by a support 518. Furthermore, in the illustrated example, a DMD cover 557 is provided for the DMD 551.

Hereinafter, the second movable plate 552 is a substrate on which the DMD 551 is disposed.

<Example of Position Detecting Unit>

Figure 9:
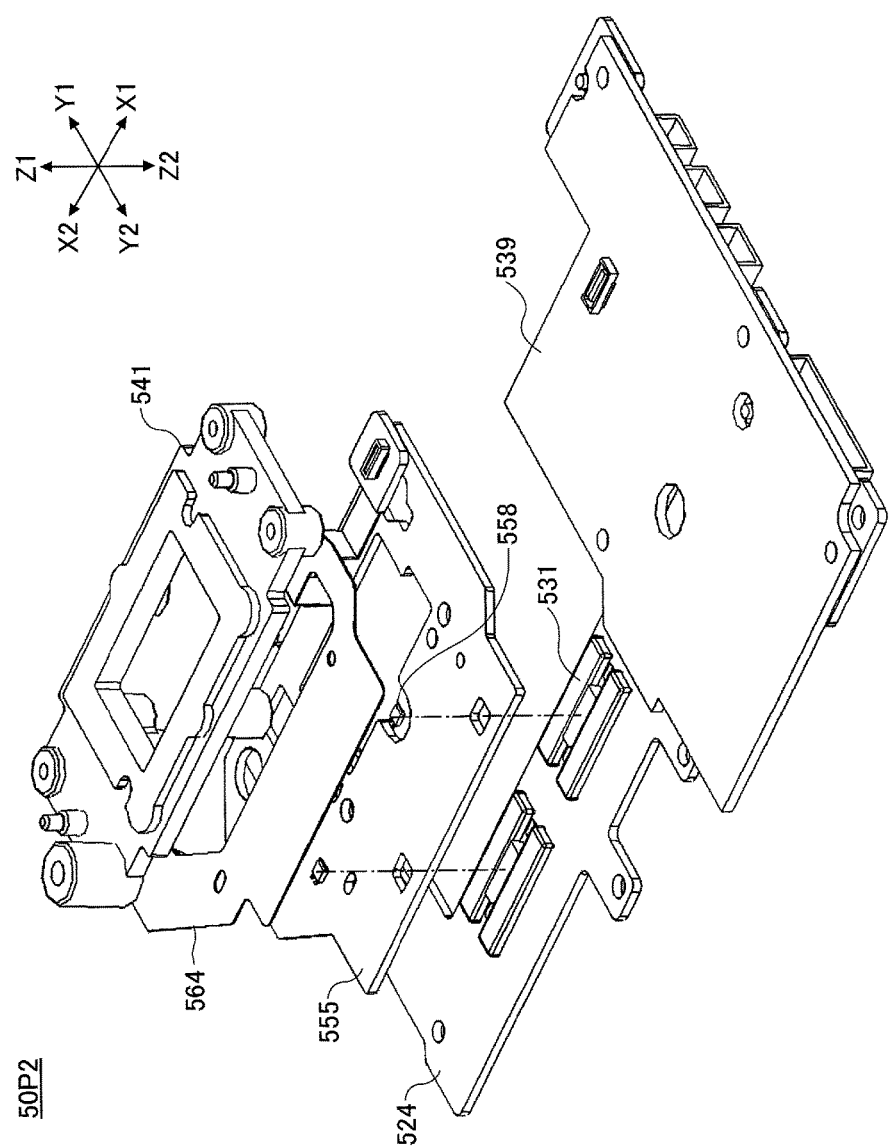
FIG. 9 is an exploded perspective view of a configuration example of a position detecting unit according to an embodiment of the present invention.

FIG. 9 is an exploded perspective view of a configuration example of the position detecting unit 50P2 according to the embodiment.

In the illustrated example, the position detecting unit 50P2 includes a Hall element 558 and a position detection magnet 531, etc., in order to detect the movement amount of the DMD 551, etc. Therefore, in this example, the first movable plate 553, the second movable plate 552, and the Hall element 558, constituting the driving force generating unit 50P1, move integrally.

Therefore, in this example, the position detecting unit 50P2 includes a first member 541 that is an example of a first portion, and the first movable plate 553 and the second movable plate 552, etc., are attached to the first member 541.

Note that in the figure, the Hall element 558 is described as a single body; however, the Hall element 558 is mounted on a position detection flexible printed wiring board (FPC) 564. The position detection FPC 564 is attached to a third movable plate 555. Therefore, in the illustrated example, when the third movable plate 555 moves, the Hall element 558 also moves together with the third movable plate 555. Note that the third movable plate 555 moves relative to a fixed portion such as a fourth fixed plate 524, etc.

Furthermore, in the illustrated example, the position detection FPC 564, on which the Hall element 558 is mounted, is electrically connected to a control board 539. The Hall element 558 is a type of magnetic sensor and detects a change in magnetic flux of the position detection magnet 531. Therefore, the control board 539 performs calculation to convert the magnetic flux change of the position detection magnet 531 detected by the Hall element 558, into a movement amount. Next, the control board 539 determines the amount of current to be supplied to the voice coil 533X and the voice coil 533Y based on the calculated movement amount.

<Example of Cooling Unit>

Figure 10:
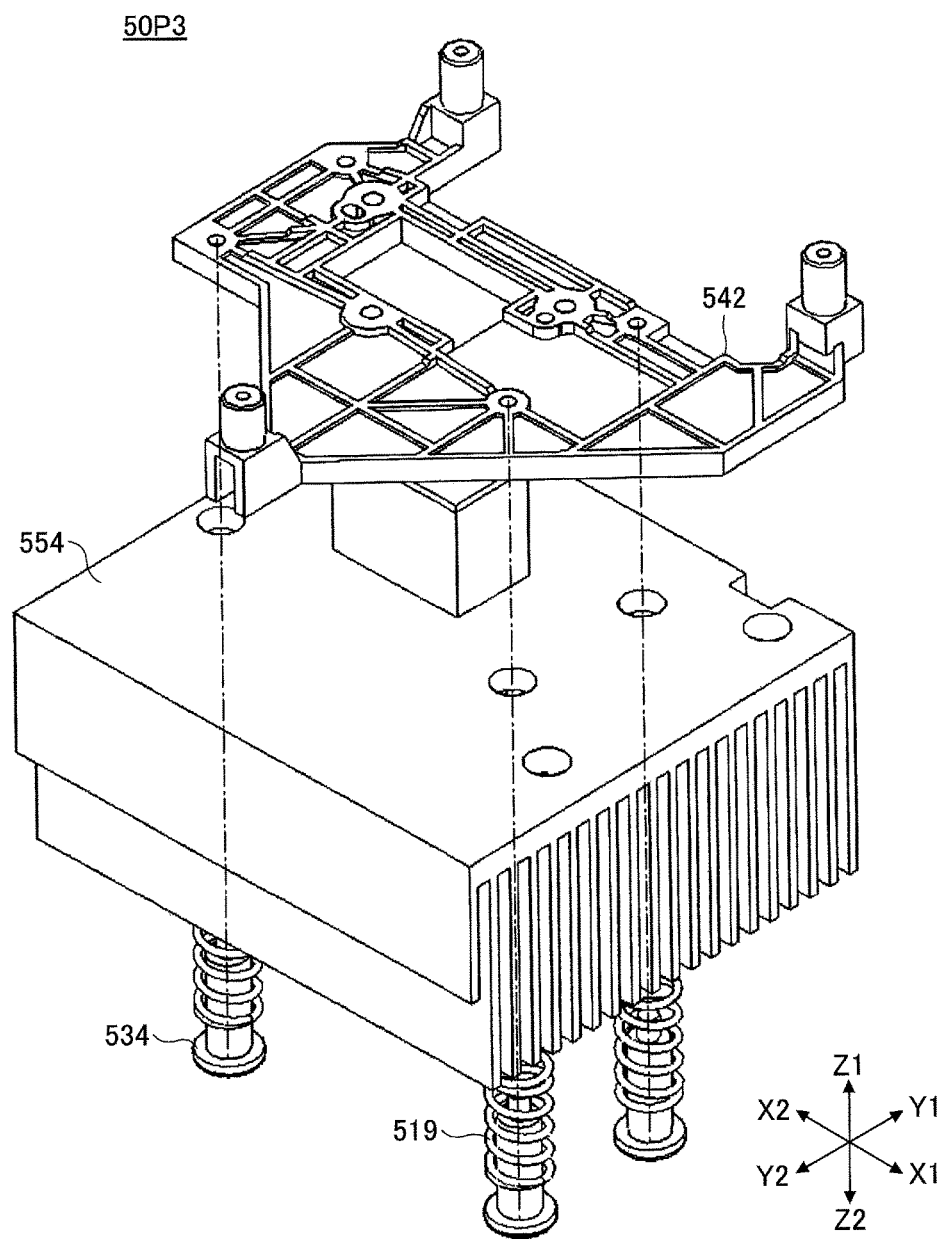
FIG. 10 is an exploded perspective view of a configuration example of a cooling unit according to an embodiment of the present invention.

FIG. 10 is an exploded perspective view of a configuration example of the cooling unit 50P3 according to the embodiment.

In the illustrated example, the cooling unit 50P3 includes a heat sink 554, etc., as an example of a heat radiation member, to cool the DMD 551. When the heat sink 554 is pressed against the DMD 551, the heat generated by the DMD 551 is released from the heat sink 554.

Furthermore, in this example, in order to press the heat sink 554 against the DMD 551, fixing members such as a stepped screw 534 and a compression spring 519 are used. Note that the fixing members are not limited to the stepped screw 534 and the compression spring 519, etc., and any mechanism component for attaching the heat sink 554, may be used.

Furthermore, in this example, the heat sink 554 is movable. Therefore, the heat sink 554 is directly or indirectly connected to the first movable plate 553. Specifically, the cooling unit 50P3 includes a second member 542 that is an example of the second portion, and the second member 542 is attached to the first movable plate 553. With such a configuration, when the first movable plate 553 moves, the movement of the first movable plate 553 is transmitted to the second member 542. The movement of the first movable plate 553 is transmitted to the heat sink 554 via the stepped screw 534 attached to the second member 542.

The heat sink 554 is pressed against the DMD 551 by the stepped screw 534 and the compression spring 519, etc. Therefore, the position of the heat sink 554 on the Z axis is determined by the position of the back surface of the DMD 551. On the other hand, the position of the heat sink 554 on the X axis and the Y axis has degrees of freedom, such as from play of the stepped screw 534.

In the illustrated example, the stepped screw 534 penetrates the heat sink 554, and is attached to the second member 542. The pressing force is generated by the compression spring 519, etc. Specifically, the heat sink 554 is pressed against the DMD 551 by the elastic force of the compression spring 519 compressed between the seating surface of the stepped screw 534 and the base surface of the heat sink 554.

In the illustrated example, the reaction force against the elastic force of the compression spring 519 acts on the second member 542. That is, with such a configuration, the reaction force is not directly transmitted to the substrate on which the DMD is mounted. Therefore, due to the rigidity of the second member 542, the deflection of the substrate on which the DMD is mounted, can be reduced.

<Example of Movable Portion>

Figure 11:
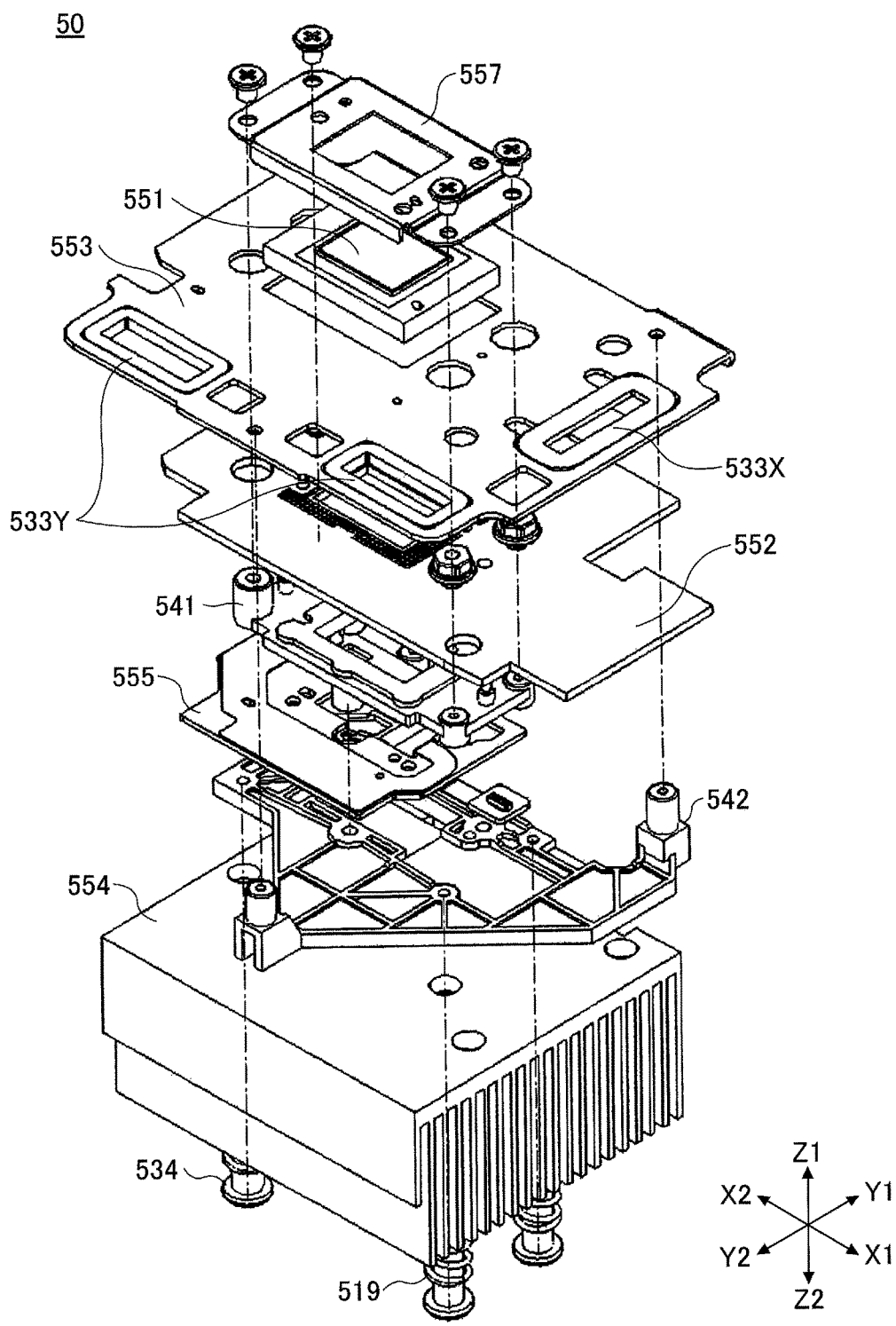
FIG. 11 is an exploded perspective view illustrating a configuration example of a movable portion of the image forming unit according to an embodiment of the present invention.

FIG. 11 is an exploded perspective view of a configuration example of a movable portion of the image forming unit 50 according to the embodiment. Among the components of the image forming unit 50, the illustrated portions are movable portions, and the figure illustrates the image forming unit 50 without displaying the fixed portions, such as the first fixed plate 521, the second fixed plate 513, the third fixed plate 523, the support 518, the driving magnet 532X, the driving magnet 532Y, the ball 522, and the ball supporting portion 526.

As illustrated in the figure, the driving force generated by the voice coil 533X and the voice coil 533Y first acts on the first movable plate 553.

Next, the second member 542 is attached to the first movable plate 553, and, therefore, the movement of the first movable plate 553 is transmitted to the second member 542. The first member 541 is attached to the second member 542, and, therefore, the movement of the first movable plate 553 is transmitted to the first member 541.

Furthermore, the second movable plate 552 and the third movable plate 555 on which the DMD 551 is mounted, are attached to the first member 541, and, therefore, the movement of the first movable plate 553 moves the second movable plate 552 and the third movable plate 555, so that the DMD 551 moves.

Then, the Hall element 558 detects the movement by the first movable plate 553.

In the configuration illustrated in the figure, for example, the first movable plate 553, etc., is the example of the movable portion. However, the movable portion may be any portion as long as the DMD 551 can be moved. On the other hand, in this configuration, the first fixed plate 521, etc., is an example of the fixed portion.

<Overall Processing Example>

Three examples indicating the timing of performing the calibration will be described below.

First Example

Figure 12:
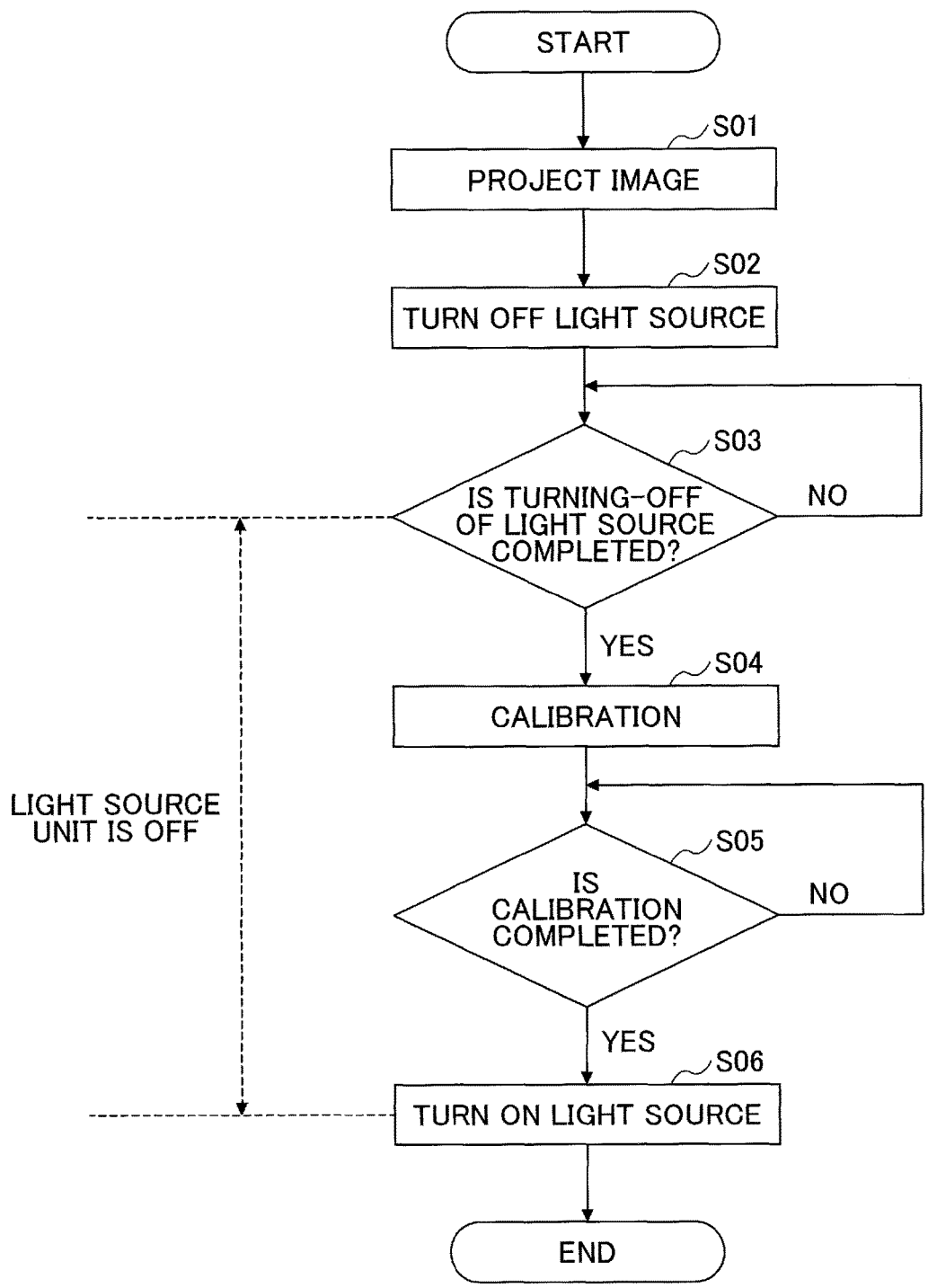
FIG. 12 is a flowchart illustrating a first example of the overall processing according to an embodiment of the present invention.

FIG. 12 is a flowchart illustrating a first example of overall processing according to the embodiment. In this example, calibration is performed when the projector is in use.

In step S01, the system controller 10 projects an image. That is, the light source of the projector is on, and the projector generates an image based on the image data and projects the image. As described above, it is assumed that, when an image is projected by the projector, for example, a user performs an operation such as pressing a button to instruct the calibration to be performed. When such an operation is accepted, the system controller 10 proceeds to step S02.

In step S02, the system controller 10 turns off the light source in response to the light source being on.

In step S03, the system controller 10 determines whether the turning-off of the light source is completed. When the light source is turned off in step S02 and step S03, the projector does not project light because light is not supplied from the light source. Therefore, the user cannot see the image.

Next, when it is determined that the turning-off of the light source is completed (YES in step S03), the system controller 10 proceeds to step S04. On the other hand, when it is determined that the turning-off of the light source is not completed (NO in step S03), the system controller 10 repeats step S03 and waits until the turning-off of the light source is completed.

In step S04, the system controller 10 performs calibration. For example, the calibration is performed by driving the movable portion. In the calibration, the degree to which the movable portion is to be moved, that is, a fixed amount, is preset. Specifically, in the calibration, the movable portion is set to move from one end to the other end of a movable range whose length is known. Then, the system controller 10 detects the position of the movable portion, at the position to which the movable portion has moved by the fixed amount. Subsequently, the system controller 10 adjusts, for example, the numerical value, etc., indicating the position, to be substantially the same as the value at the time of shipment. Specifically, the projector adjusts a parameter (hereinafter referred to as a "control parameter"), such as the sensitivity of the sensor, for example.

When the sensitivity is set to the value at the time of shipment, if the magnet used for position detection is demagnetized after shipment, or the gap between the sensor and the magnet is expanded, even if the movable portion is at the same position, a different detection result is often obtained. Therefore, in such a case, for example, the system controller 10 adjusts the control parameter so as to increase the sensitivity. When such adjustment is made, even if the magnetic force is weakened, the sensitivity is high, and, therefore, the position of the movable portion can be detected in almost the same way as at the time of shipment.

Note that the control parameter is not limited to the sensitivity, but may be a movement amount, etc., corresponding to the position to be detected.

In the case where the position detecting unit is implemented by the position detection magnet and the Hall element, etc., as in the present embodiment, when the magnetic force is subjected to the passage of time, temperature change, and external magnetic force, etc., so-called demagnetization occurs, and the magnetic force may change.

Also, there are cases where an impact, etc. is applied, and the gap between the position detection magnet and the Hall element may change. If the distance between the sensor and the magnet changes, the detection result also changes in many cases.

In these cases, even if the detection target is at the same position, the obtained detection result is often different from that obtained at the time of shipment. Therefore, it is desirable to perform calibration in such a case. When the calibration is performed, the control parameter, etc., is adjusted, and, therefore, the system controller 10 can perform position detection, etc., in the same way as at the time of shipment, even if there is such a change as described above.

In step S05, the system controller 10 determines whether the calibration is completed.

Next, when it is determined that the calibration is completed (YES in step S05), the system controller 10 proceeds to step S06. On the other hand, when it is determined that the calibration is not completed (NO in step S05), the system controller 10 repeats step S05 and waits for the calibration to be completed.

In step S06, the system controller 10 turns on the light source. That is, the projector prepares to project an image, etc. Therefore, in step S06, the system controller 10 may perform various processes for projecting an image in addition to turning on the light source.

Second Example

Figure 13:
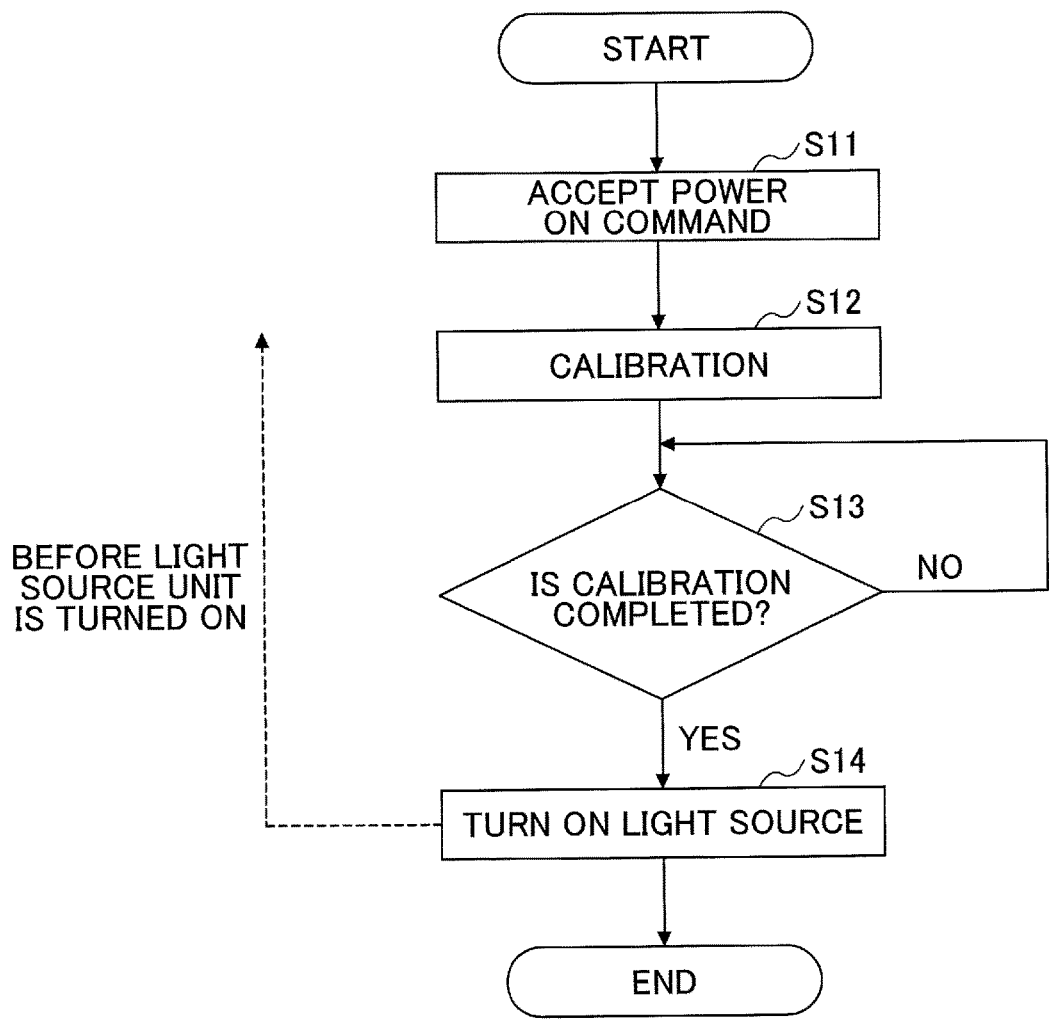
FIG. 13 is a flowchart illustrating a second example of the overall processing according to an embodiment of the present invention.

FIG. 13 is a flowchart illustrating a second example of overall processing according to the embodiment. In this example, calibration is performed when the use of the projector is started, for example, when the light source is off at the time of performing an operation to turn on the power.

In step S11, the projector accepts a power ON command. For example, to turn on the power, the user turns on the SW 5. When the system controller 10 accepts such an input from the SW 5, the projector determines that there is a power-on command.

In step S12, the system controller 10 performs calibration in response to the light source being off. For example, step S12 is the same processing as step S04.

In step S13, the system controller 10 determines whether the calibration is completed.

Next, when it is determined that the calibration is completed (YES in step S13), the system controller 10 proceeds to step S14. On the other hand, when it is determined that the calibration is not completed (NO in step S13), the system controller 10 repeats step S13 and waits for the calibration to be completed.

In step S14, the system controller 10 turns on the light source. That is, the system controller 10 prepares the projector so that each process such as projecting an image can be performed. Therefore, in step S14, in addition to turning on the light source, the system controller 10 may perform so-called preprocessing, etc., which is performed before each processing is executed.

Third Example

Figure 14:
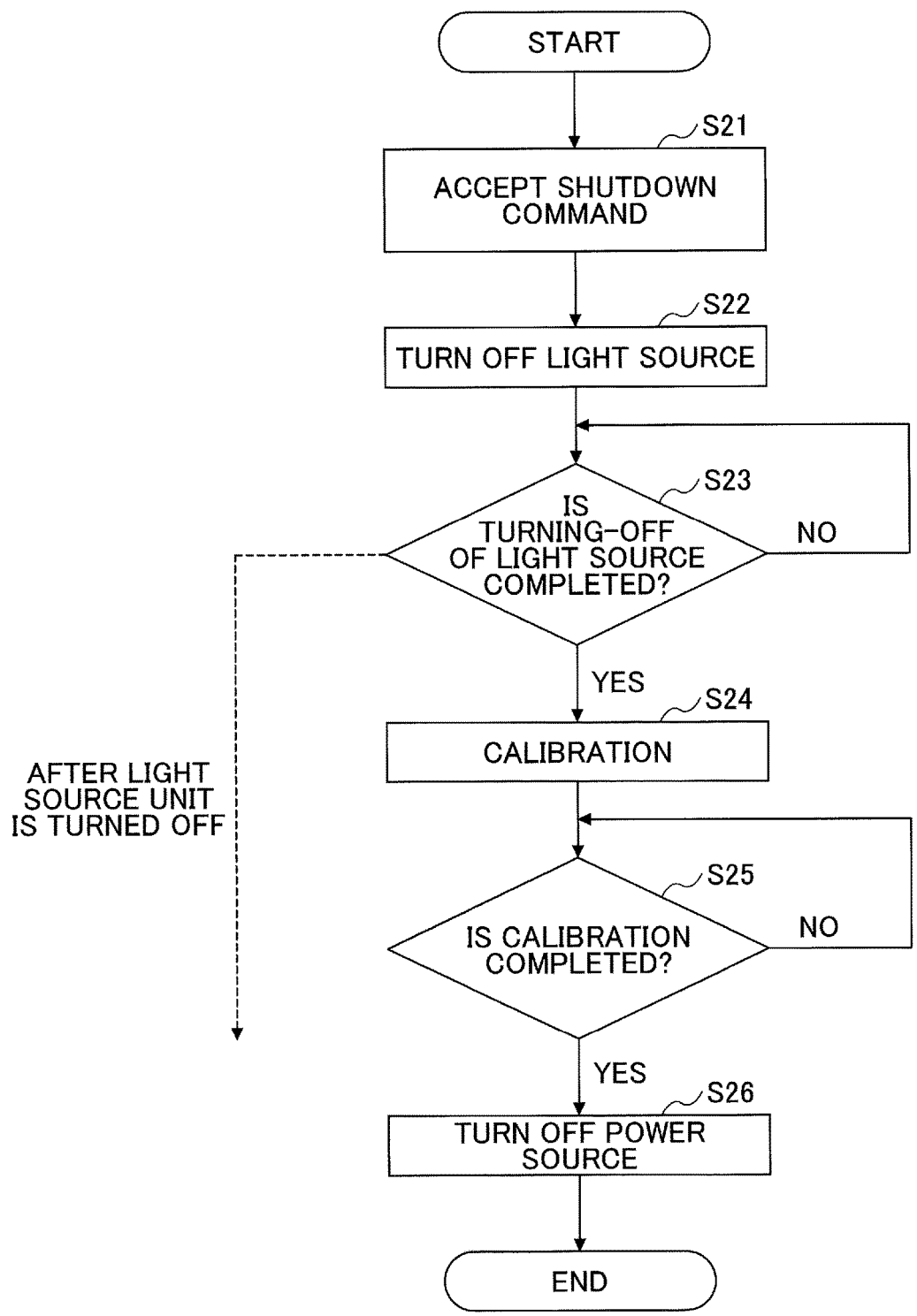
FIG. 14 is a flowchart illustrating a third example of the overall processing according to an embodiment of the present invention.

FIG. 14 is a flowchart illustrating a third example of the overall processing according to the embodiment. In this example, the calibration is performed, for example, when the use of the projector is terminated and the projector is shut down.

In step S21, the projector accepts a shutdown command. For example, to turn off the power, the user turns off the SW 5. When the system controller 10 accepts such an input from the SW 5, the projector determines that there is a shutdown command.

In step S22, the system controller 10 turns off the light source in response to the light source being on.

In step S23, the system controller 10 determines whether the turning-off of the light source is completed. When the light source is turned off in step S22 and step S23, the projector does not project an image because light is not supplied from the light source. Therefore, the user cannot see an image.

Next, when it is determined that the turning-off of the light source is completed (YES in step S23), the system controller 10 proceeds to step S24. On the other hand, when it is determined that the turning-off of the light source is not completed (NO in step S23), the system controller 10 repeats step S23 and waits until the turning-off of the light source is completed.

In step S24, the system controller 10 performs calibration. For example, step S24 is the same processing as step S04.

In step S25, the system controller 10 determines whether the calibration is completed.

Next, when it is determined that the calibration is completed (YES in step S25), the system controller 10 proceeds to step S26. On the other hand, when it is determined that the calibration is not completed (NO in step S25), the system controller 10 repeats step S25 and waits for the calibration to be completed.

In step S26, the projector turns off the power. Note that in step S26, the system controller 10 may terminate each process performed by the system controller 10, or may terminate the control of each piece of hardware.

<Example of Functional Configuration>

Figure 15:
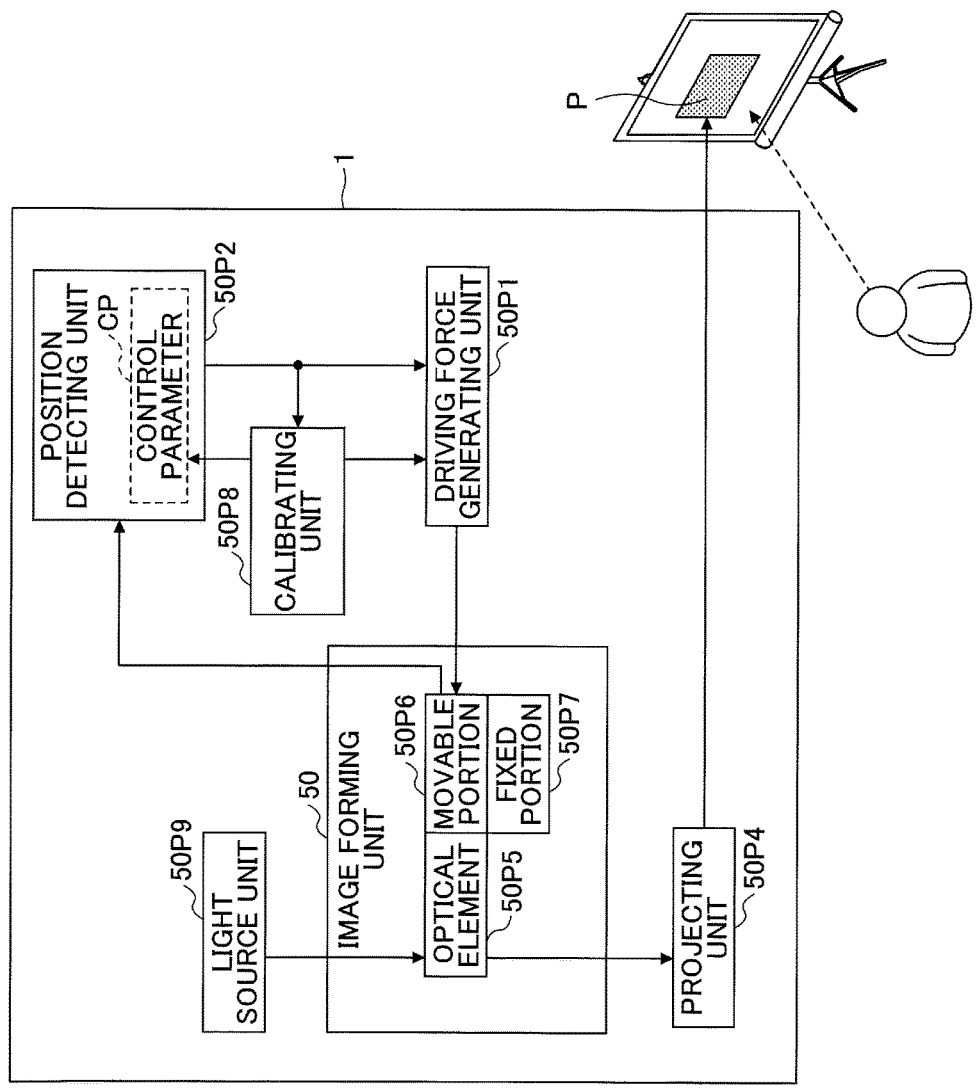
FIG. 15 is a functional block diagram illustrating a functional configuration example of an image projection apparatus according to an embodiment of the present invention.

FIG. 15 is a functional block diagram illustrating a functional configuration example of the image projection apparatus according to the embodiment. For example, as illustrated in the figure, the projector 1 has a functional configuration including the driving force generating unit 50P1, the position detecting unit 50P2, a projecting unit 50P4, a movable portion 50P6, a fixed portion 50P7, a calibrating unit 50P8, and a light source unit 50P9, etc.

The driving force generating unit 50P1 performs a driving force generation procedure for generating a driving force for driving the movable portion 50P6. For example, the driving force generating unit 50P1 is implemented by the system controller 10 and the configuration illustrated in FIG. 8, etc.

The position detecting unit 50P2 performs a position detection procedure for detecting the position of the movable portion 50P6. For example, the position detecting unit 50P2 is implemented by the configuration illustrated in FIG. 9, etc.

The projecting unit 50P4 projects the image P formed by the image forming unit 50. For example, the projecting unit 50P4 is implemented by the projection optical system unit 60, etc.

The calibrating unit 50P8 performs calibration. For example, the calibrating unit 50P8 8 is implemented by the system controller 10, etc.

The light source unit 50P9 emits light and supplies light to the image forming unit 50. For example, the light source unit 50P9 is implemented by the light source 30, etc.

First, when the image P is formed by an optical element 50P5 in the image forming unit 50, the projecting unit 50P4 projects the image P by using the light supplied from the light source unit 50P9. In this manner, when the image P is projected during the use of the projector 1, the user can see the image P.

Then, the optical element 50P5 can be moved by a movable unit such as of the movable portion 50P6 and the fixed portion 50P7. Specifically, the driving force generating unit 50P1 generates a driving force and the movable portion 50P6 is driven, whereby the optical element 50P5 can move. In this manner, if the optical element 50P5 can move, the image to be formed can be shifted and projected with high image quality, etc.

Then, the position of the movable portion 50P6 is detected by the position detecting unit 50P2. This detection result is fed back to the driving force generating unit 50P1. Therefore, the driving force generating unit 50P1 can recognize the position, etc., of the movable portion 50P6 based on the detection result of the position detecting unit 50P2, and implement control to move the position of the movable portion 50P6 to a plurality of preset positions to form an image.

The position detecting unit 50P2 detects the position, etc., of the movable portion 50P6 based on a control parameter CP. Therefore, if the control parameter CP is not set in accordance with the movable portion 50P6, detection by the position detecting unit 50P2 is likely to be affected. Therefore, when there is demagnetization, etc., it is preferable to perform calibration and adjust the control parameter CP.

The calibrating unit 50P8 performs calibration in a state in which the light source unit 50P9 is off. For example, the calibrating unit 50P8 instructs the driving force generating unit 50P1 to move the movable portion 50P6 to a position for calibration, and causes the position detecting unit 50P2 to detect the position, etc., of the movable portion 50P6 at the moved position. In this way, the calibrating unit 50P8 can update the control parameter CP to a value, etc., that matches the current state.

<Effects>

In the state in which the light source is off as described above, the projector performs the calibration. When the calibration is performed at such a timing, the projector can prevent the image from being projected during the calibration. When an image is projected during calibration, the optical element moves due to calibration, and, therefore, the projection image often moves greatly. Such an image is not intended by the user, and, therefore, the user may feel discomfort if such an image is visible to the user.

Therefore, as in the present embodiment, the projector performs calibration in a state in which the light source is off, so that the image is not projected during the calibration. In this way, the projector can prevent the image from being projected during the calibration and giving the user discomfort.

Also, as in the second example, when the power source is on, etc., the light source is not yet turned on, and, therefore, the light source is off. Similarly, as in the third example, the light source is often turned off at the time of shutdown. As in these examples, it is desirable that the calibration is performed after the light source is turned off or before the light source is turned on.

Furthermore, for example, as disclosed in Patent Document 3, the operation of shielding the calibration light to make the image invisible, cannot be implemented without a mechanism, etc., for shielding the light. Furthermore, in this method, the laser light is calibrated, and, therefore, the light source cannot be turned off. On the other hand, when the light source can be turned off as in the present embodiment, there will be no need for a mechanism, etc., for shielding the light as described above.

<Example of Image Projection>

For example, during the projection of an image, the drive control unit 12 controls the position of the DMD 551 so as to move at high speed between a plurality of positions separated by a distance less than the arrangement intervals of a plurality of micromirrors of the DMD 551, at a cycle based on a frame rate, etc. By using the position information detected by the sensor, the image control unit 11 transmits image signals to the DMD 551 so as to generate a projection image shifted according to the respective positions.

For example, the drive control unit 12 causes the DMD 551 to move back and forth at a predetermined cycle between positions separated by a distance less than the arrangement intervals of the micromirrors of the DMD 551, in the X direction and the Y direction. As the image control unit 11 controls the DMD 551 so as to generate a projection image shifted according to the respective positions, the resolution of the projection image can be approximately twice the resolution of the DMD 551. Furthermore, if the moving positions of the DMD 551 are increased, the resolution of the projection image can be made twice or more the resolution of the DMD 551.

Therefore, the drive control unit 12 shifts the DMD 551, etc., and the image control unit 11 generates a projection image according to the position of the DMD 551. By controlling in this manner, it becomes possible to project an image whose resolution has been made higher than the resolution of the DMD 551.

Other Embodiments

Note that the above-described configuration of the cooling unit, etc., is not essential. For example, in order to enhance the cooling effect of the DMD 551, there may be an elastically deformable heat transfer sheet, etc., between the heat sink 554 and the DMD 551. In this way, if the heat transfer sheet is provided, the thermal conductivity between the heat sink 554 and the DMD 551 is improved, and the effect of cooling the DMD 551 is improved.

Furthermore, at least one or more of the movable plate and the fixed plate, etc., preferably include a conductive material such as stainless steel, aluminum, and magnesium alloy, etc. With such a configuration, for example, electrical noise generated in the DMD 551 or in the substrate, etc., on which the DMD 551 is mounted, can be released, for example, to the housing, etc., through the conductive material. Therefore, noise leakage to the outside can be reduced.

In the present embodiment, a yoke plate may be formed by using a plate of a magnetic material. With such a configuration, the generated magnetic flux concentrates on the plate functioning as the yoke plate, and, therefore, leakage of the magnetic flux can be reduced.

Note that the image projection apparatus need not be one apparatus. That is, the image projecting apparatus may be a system formed of a plurality of apparatuses. For example, in the system, a plurality of apparatuses may perform processes related to the image projection method in a distributed, redundant, or parallel manner.

Furthermore, each procedure related to the image projection method may be implemented by a program. In other words, the image projection method may be executed by a computer having an arithmetic device and a storage device, etc., by performing a procedure related to the image projection method based on the program.

According to one embodiment of the present invention, it is possible to prevent the movement of the projection position of a projection image from being projected, during calibration of a sensor that detects a position of a movable portion to which an optical element is attached, without using a light shielding unit.

The image projection apparatus and the image projection method are not limited to the specific embodiments described in the detailed description, and variations and modifications may be made without departing from the spirit and scope of the present invention.

What is claimed is:

1. An image projection apparatus comprising:
a light source;
an optical element configured to form an image by modulating a light emitted by the light source;
a movable portion to which the optical element is attached, the movable portion being movably supported;
a position detector configured to detect a position of the movable portion;
a projector configured to project the image formed at a predetermined position by using the position detected by the position detector; and
a controller configured to execute calibration with respect to the position detector, and to execute at least one of turning off the light source before executing the calibration in response to the light source being on, and turning on the light source after the calibration is executed.

2. The image projection apparatus according to claim 1, wherein the controller turns on the light source after the calibration is executed, in response to a predetermined switch being operated when the light source is off.

3. The image projection apparatus according to claim 1, wherein the controller executes the calibration after the light source is turned off, in response to a predetermined switch being operated when the light source is on.

4. The image projection apparatus according to claim 3, wherein the controller turns on the light source after the calibration is executed.

5. The image projection apparatus according to claim 1, wherein the calibration is performed upon detecting the position of the movable portion at a position to which the movable portion has been moved by a predetermined amount.

6. The image projection apparatus according to claim 1, wherein the movable portion includes an electromagnetic actuator.

7. An image projection method performed by an image projection apparatus including:
a light source;
an optical element configured to form an image to be projected by using a light emitted by the light source;
a movable portion to which the optical element is attached, the movable portion being movably supported; and
a position detector configured to detect a position of the movable portion, the image projection method comprising:
projecting the image formed at a predetermined position by using the position detected by the position detector; and
executing calibration with respect to the position detector, and executing at least one of turning off the light source before executing the calibration in response to the light source being on, and turning on the light source after the calibration is executed.

* * * * *